W. W. LOVE.
Shovel Plow.

No. 96,018.　　　　　　　　　Patented Oct. 19, 1869.

WITNESSES　　　　　　　　　　　　INVENTOR

United States Patent Office.

W. W. LOVE, OF ATHENS, OHIO.

Letters Patent No. 96,018, dated October 19, 1869.

IMPROVEMENT IN METALLIC DOUBLE-SHOVEL PLOW.

The Schedule referred to in these Letters Patent and making part of the same

To all whom it may concern:

Be it known that I, W. W. LOVE, of Athens, in the county of Athens, and State of Ohio, have invented an Improved Metallic Double-Shovel Plow or Cultivator; and I do hereby declare the following to be a full and exact description thereof, reference being had to the accompanying drawings, forming a part of this specification, in which—

Figure 1:
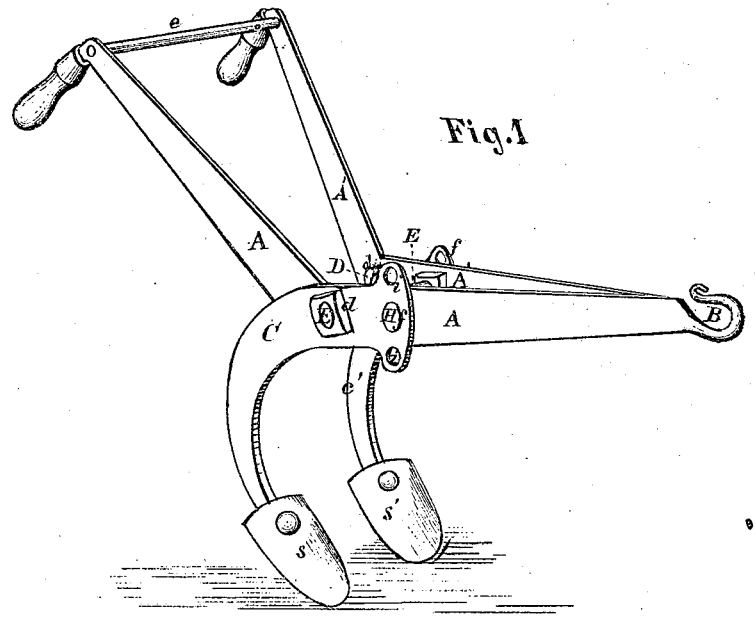

Figure 1 is a view in perspective of my improved double-shovel plow, and

Figure 2:
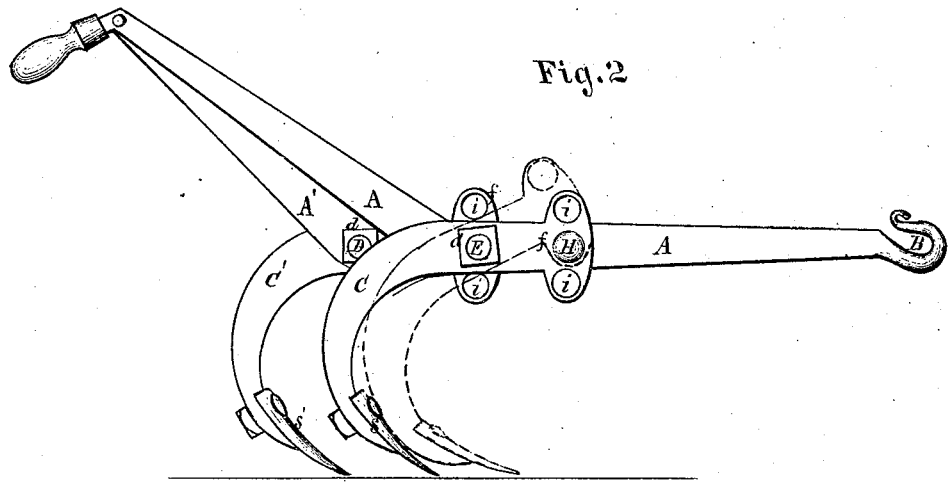

Figure 2, a side elevation thereof, with an adjustment of one of its shares or shovels illustrated by red lines.

The nature of my invention consists of the combination of adjustable curved knees carrying the shares or shovels of the implement, with double beams extended out so as to form handles for the same, whereby the shovels may be set at any angle, and to any desired pitch for work, without varying the direct line of draught in the plow.

In the accompanying drawings—

A A' represent the double draught-beam of the plow.

The two arms of the beam A and A' are made of steel or iron, each in one continuous piece, extended so as to form a handle thereto, as illustrated in the drawings, and are united at their forward extremities, and welded together, to form the hook B.

Upon each side of the double draught-beam A A', curved knees, C C', carrying the plows or shovels S S' of the implement are pivoted by means of pivot-bolts, D, which are secured by nuts, $d$, on the inner side thereof, or the end of the cross-rod E, extending between the two arms A A' of the draught-beam may serve as the pivot for one of the knees, (as illustrated in the drawings,) instead of a separate bolt.

The upper front ends of the curved knees extend beyond the pivot-points thereof, and form segments, $f$, having their centres in the pivots D or E.

These segmental ends $f$ are pierced with a series of bolt-holes, $i$, to receive screw-bolts or pins, H, by which the front ends of the knees are secured to the draught-beams, and held at any desired angle.

When these stay-bolts H are withdrawn, the curved knees, and their shovels, are left free to vibrate upon their pivots at D and E, and when set in a proper inclination, are secured by means of said bolts.

The positive lines, in figs. 1 and 2, illustrate the plows or shovels set at the ordinary pitch, and the red lines the shovel C, set at an angle for shallow work.

My improved plow may be thus constructed of metal in three main pieces, viz, the draught-beam and its handles in one, and the curved knees, with their shovel, constituting the remaining two. These parts are readily put together, and secured by means of screw-bolts, and steadied by means of the transverse rods E and $e$.

Having thus fully described my invention, I do not claim the double beam A A', nor the curved knees C C'. The novelty of my invention consists in the extension of the double beam so as to form handles for the plow, and in the combination with such, an extended double beam of adjustable curved knees, which admit of being readily set in any desired pitch.

I claim, therefore, as new, and desire to secure by Letters Patent—

The adjustable pivoted knees C C', combined with the double extended draught-beam A A' of a double-shovel plow or cultivator, constructed substantially as herein set forth.

The foregoing specification of my improved double-shovel adjustable plow or cultivator, signed by me, this 8th day of April, 1869.

W. W. LOVE.

Witnesses:
HENRY T. BROWN,
F. J. RYAN.